May 2, 1961    R. W. REICH    2,982,881
PORTABLE LIGHT SOURCE
Filed May 22, 1958    2 Sheets-Sheet 1

*INVENTOR.*
ROBERT W. REICH
BY Isidore Match

May 2, 1961 R. W. REICH 2,982,881
PORTABLE LIGHT SOURCE
Filed May 22, 1958 2 Sheets-Sheet 2

INVENTOR.
ROBERT W. REICH
BY Isidore Match

United States Patent Office 2,982,881
Patented May 2, 1961

2,982,881

PORTABLE LIGHT SOURCE

Robert W. Reich, Rotackerstrasse, Freiburg im Breisgau, Germany

Filed May 22, 1958, Ser. No. 737,101

6 Claims. (Cl. 315—205)

This invention relates to light producing devices. More particularly it relates to portable miniaturized light sources capable of providing light intensities which are much greater than that provided by presently known devices of a similar character.

Heretofore flashlights, hand lamps, and other portable lamps have utilized as the light source therein, incandescent bulbs. Such bulbs have required for their operation voltages having a magnitude directly related to the size of the bulb employed.

The use of incandescent bulbs entails many advantages. For example, their light output is relatively low, and the color of their light is reddish, with its consequent poor illumination and penetration properties. Where the incandescent bulbs are of small enough size to be used in pocket flashlights, of necessity the size and hence the capacity of the batteries by which they are powered must also be of correspondingly small size. This is so since the batteries have to be of relatively small weight and should take up little space. The necessary small size of the battery results in the use of an incandescent bulb of low output and short life. In effect, the light radiated from incandescent flashlight bulbs is slight and the effective life thereof is brief.

The light yield of electron discharge tubes such as fluorescent tubes, electronic flash tubes, and the like is substantially a multiple greater than incandescent tubes for the same input power. The color of the radiated light is white, in contrast to the reddish light of incandescent tubes so that a better penetrating power and a brighter illumination is achieved. For the operation of such discharge tubes, a relatively high alternating current voltage must be provided.

It is accordingly the primary object of the present invention to provide portable light producing devices wherein the light produced thereby is of a much greater intensity and whiteness than that produced by similar known devices of corresponding size and of corresponding power requirement.

It is a further object to provide a device as set forth in the preceding object wherein the source of electric power therefor comprises either primary or secondary batteries.

It is another object to provide such a light source wherein the powering elements required to operate the light source are contained in a first housing and the light source is contained in a second housing which is engageable with the first housing.

Generally speaking, there is provided in accordance with the invention a portable light producing device comprising housing means containing therein a battery, an oscillator circuit coupled to the battery for producing an alternating current voltage and an electron discharge tube coupled to the oscillator circuit. The electron discharge tube is one which produces luminescence when a voltage is applied thereacross.

In accordance with an embodiment of the invention there is provided a portable light source comprising a first housing containing therein a storage battery, a transistor oscillator circuit coupled to the battery for producing an alternating current voltage and a transformer comprising at least input and output windings, the input winding being coupled to the output of the oscillator circuit. Rectifying means may be included in circuit with the output winding of the transformer for producing a substantially direct current voltage. A charging circuit is also included within the first housing which is adapted to be connected to the battery to charge it, a plurality of prongs being associated with the first housing for connecting the charging circuit to a power line voltage source. The charging circuit comprises a series arrangement of an impedance and a rectifier, one end of the rectifier being adapted for connection to the positive terminal of the battery, one end of the impedance being connected to one of the prongs, and a capacitance having one end connected to the junction point of the respective other ends of the rectifier and the impedance, the other end of the capacitor being connected to the negative terminal of the battery and a second of the prongs. In the charging circuit, the values of the capacitance and the impedance are so chosen that their time constant is greater than a time of a cycle from the power source. A second housing is provided which is engageable with the first housing and which contains an electronic photo flashtube. Means are provided for engaging the first and second housings and means are also provided for coupling the output winding of the transformer to the tube when the housings are so engaged.

For a better understanding of the invention, together with other and further objects thereof, reference is had to the following description taken in connection with the accompanying drawings and its scope will be pointed out in the appended claims.

Figure 9:
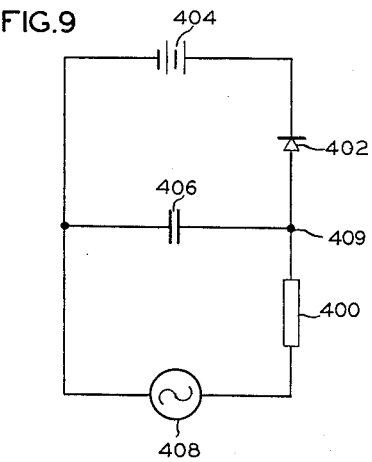
Figure 8:
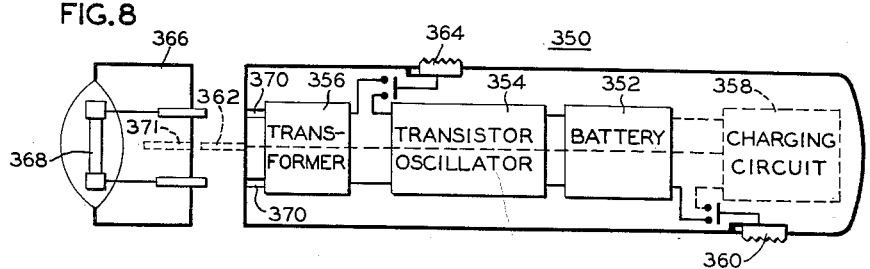

Fig. 8 is a view, partly cut away of an embodiment of the invention which shows a first housing containing a storage battery, a charging circuit therefor and transformer and a second housing engageable with the first housing and containing the electron discharge device to be operated; and Fig. 9 shows a schematic of a preferred charging circuit to be used in those situations where a storage battery is employed.

Figure 1:
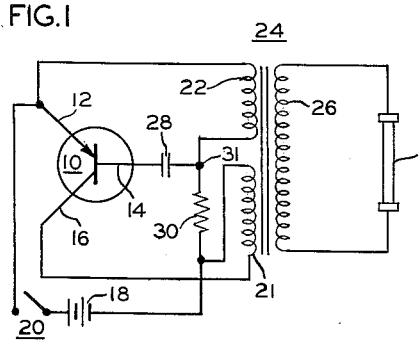
Fig. 1 is a schematic depiction of a first embodiment of a circuit in accordance with the invention for powering a portable fluorescent tube light source.

Referring now to Fig. 1, transistor 10 comprises an emitter 12, a base 14 and a collector 16. The transistor as shown may be a point contact or a PNP type conductivity junction transistor, but of course an NPN type conductivity junction transistor may be utilized, such utilization requiring merely a suitable rearrangement of biasing potentials from battery 18. Emitter 12 is connected to the fixed pole of switch 20, the rotor of switch 20 being connected to the positive terminal of battery 18. Collector 16 is connected to the negative terminal of battery 18 through a winding 21 of a transformer 24. Base 14 is connected to the negative terminal of battery 18 through a capacitance 28 and a resistance 30, the junction point 31 of the resistance and the capacitance being connected to emitter 12 through winding 22 of transformer 24. The load, i.e., the miniature fluorescent tube 32, is connected across winding 26. In operation it is seen that the circuit of Fig. 1 is an oscillator employing regenerative feedback. With this circuit, there is provided non-sinusoidal waves of needle-like configuration and the repetition frequency thereof can be determined by the selection of suitable circuit constants. The miniature fluorescent tube may be the known type which is about 3 mm. in diameter and 10 mm. in length. For higher output, such tubes are also available 10 mm. in diameter and 10 mm. in length.

Figure 2:
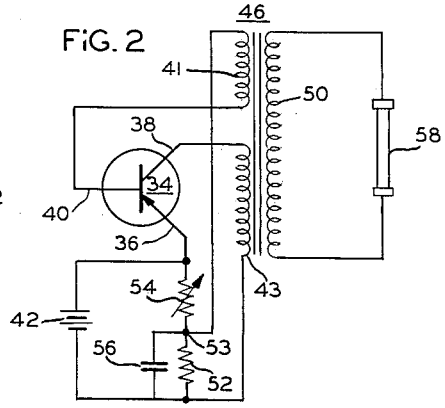
Fig. 2 is a wiring diagram of a second embodiment of a circuit to be used with a portable fluorescent tube.

Fig. 2 depicts a circuit for energizing a miniature fluorescent tube similar to Fig. 1. In this circuit, the emitter 36 of transistor 34 is connected directly to the positive terminal of the battery 42, the collector 38 being connected to the negative terminal of battery 42 through winding 43 of a transformer 46. A voltage divider network comprising resistance 52 and variable resistance 54 are connected across battery 42, a capacitance 56 being connected across resistance 52. The base 40 is connected to the junction point 53 of resistances 52 and 54 through winding 41. The fluorescent tube 58 is connected across winding 50. It is seen that the circuit of Fig. 2 is also an oscillator employing regenerative feedback to produce oscillation.

Figure 3:
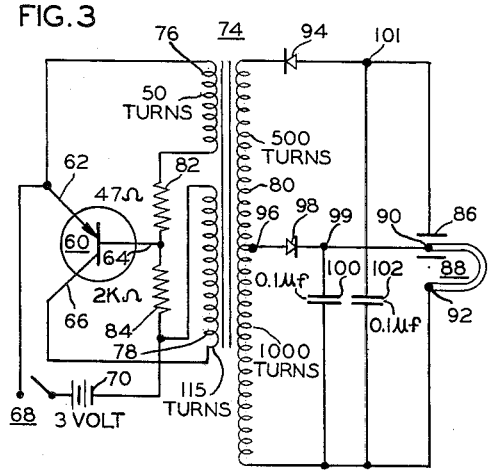
Figs. 3–7 show different embodiments in accordance with the invention of circuits to be used to operate portable electronic photoflash tubes.

In Fig. 3 there is shown an embodiment of the invention for use with photoflash tubes. In this circuit, the emitter 62 of transistor 60 is connected to the fixed pole of a switch 68, the rotor thereof being connected to the positive terminal of a battery 70. Emitter 62 is also connected to the base 64 through winding 76 of a transformer 74 and a resistance 82. Base 64 is connected to the negative terminal of battery 70 through a resistance 84. The collector 66 is connected to the negative terminal of battery 70 through winding 78 and to base 64 through resistance 84. Winding 80 of transformer 74 has one end connected to the metal shield firing electrode 86 of photo flashtube 88 through a diode 94 poled in the reverse direction of current flow, the other end thereof being connected to the anode 92 of tube 88. An intermediate point 96 on winding 80 is connected to the cathode 90 of tube 88 through a diode 98 poled in the forward direction of current flow. A capacitance 100 is connected between the junction point 99 of diode 98 and cathode 90, and the other end of winding 80. A capacitance 102 is also connected between the junction point 101 of diode 94 and metal shield firing electrode 86, and the other end of winding 80. With this arrangement a higher voltage is provided to ignite firing electrode 86 than is provided between the cathode 90 and anode 92 of tube 88. It is expedient to utilize diode 94 connected in the reverse direction for the production of the ignition voltage and to provide the voltage through another diode 98 as shown, counterpolewise, to supply the discharging energy of tube 88. Capacitances 100 and 102 are utilized in the conventional manner to provide filtering and smoothing action. Similar to the circuits of Figs. 1 and 2, the circuit behaves as an oscillator due to the use of regenerative feedback and by proper selection of suitable circuit constants a wide range of desired voltage amplitudes and repetition frequencies may be obtained. The wave forms generated by the oscillator are needlelike, similar to those generated in the circuits of Figs. 1 and 2. Typical circuit values for a given design are shown on the drawing.

Figure 4:
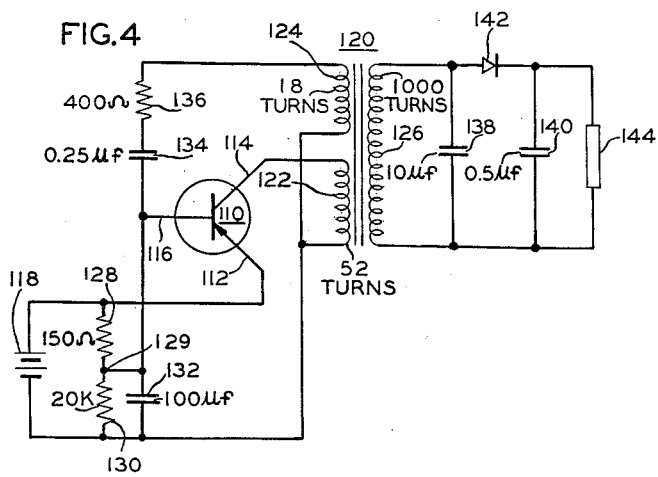

In Fig. 4 there is shown a circuit similar to that of Fig. 3. In this circuit the emitter 112 of transistor 110 is connected to the positive terminal of a battery 118 and the collector 114 is connected to the negative terminal of battery 118 through winding 122 of a transformer 120. A voltage divider comprising resistances 128 and 130 has its junction point 129 connected to base 116, base 116 being connected to the negative terminal of battery 118 through a capacitance 132, capacitance 132 being connected across resistance 130. Base 116 is also connected to collector 114 through a series arrangement of a capacitance 134, a resistance 136 and windings 124 and 122 of transformer 120. In the circuit of winding 126, there are included parallel-connected capacitances 138 and 140 and series-connected diode 142, the latter being poled in the forward direction of current flow. The flashtube is symbolically depicted by load 144. In the circuit of this figure, there is also utilized regenerative feedback to provide oscillations, the output being waves of needlelike shape as in the circuits of the preceding figures. Capacitances 138 and 140 are provided for filtering action.

Figure 5:
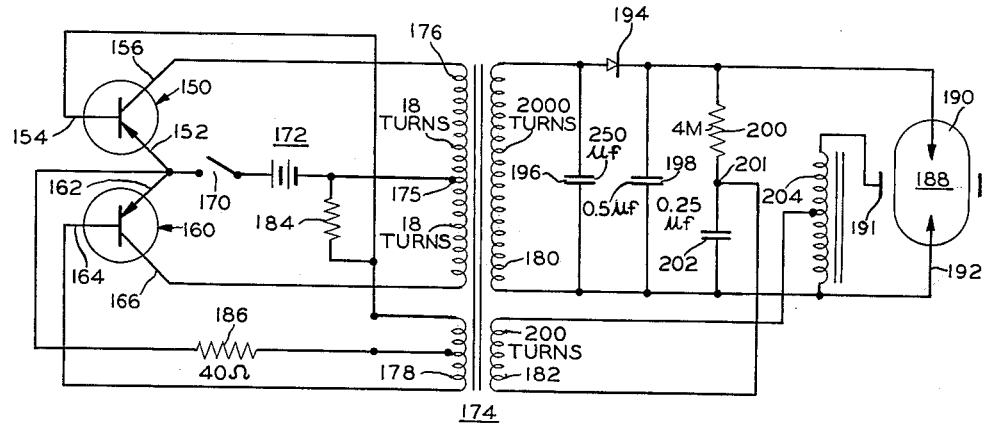

In Fig. 5 there is shown a circuit embodying this invention for providing relatively high voltages. Accordingly, two transistors 150 and 160 are connected in push-pull arrangement. Emitters 152 and 162 are connected to the fixed pole of a switch 170, the rotor of switch 170 being connected to the positive terminal of a battery 172. Collectors 156 and 166 are connected respectively to opposite ends of winding 176 of a transformer 174, an intermediate point 175 of winding 176 being connected to the negative terminal of battery 172. Base 154 is connected to the negative terminal of battery 172 through a resistance 184 and base 164 is connected to negative terminal of battery 172 through winding 178 and resistance 184. Collector 156 is connected to base 154 through point 175 and resistance 184 and collector 166 is connected to base 164 through point 175, resistance 184 and winding 178. An intermediate point on winding 178 is connected to emitters 152 and 162 through resistance 186. Winding 180 has one end thereof connected to the cathode 190 of the photo flashtube through a diode 194 poled in the forward direction of current flow, the other end of winding 180 being connected to the anode 192 of tube 188. Parallel connected across winding 180 are capacitances 196 and 198, substantially as shown, as is a series combination of a resistance 200 and a capacitance 202. Winding 182 has one end thereof connected to the junction point 201 of resistance 200 and capacitance 202, the other end winding 182 being connected to an intermediate point on a coil 204. Coil 204 has one end connected to the metal shield firing electrode 191 of tube 188, the other end of coil 204 being connected to the other end of winding 180. In the circuit of Fig. 5, ignition voltage is applied to the firing electrode 191 of tube 188 through winding 182 and coil 204, the direct current voltages for cathode 190 and anode 192 respectively being produced through the action of diode 194 and capacitances 196 and 198. The circuit is an oscillator such as those shown in the preceding figures and due to its push-pull arrangemen., capable of producing relatively high voltages.

Figure 6:
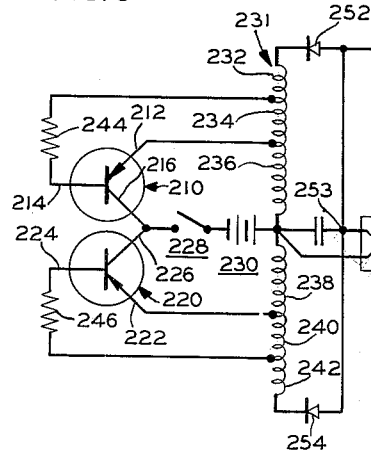

In Fig. 6 there is shown another arrangement for a circuit for energizing a photo flashtube wherein two transistors are connected in push-pull. In this arrangement, collectors 216 and 226 of respective transistors 210 and 220 are connected to the fixed pole of a switch 228, the rotor thereof being connected to the negative terminal of a battery 230. Emitters 212 and 222 respectively are connected to the positive terminal of battery 230 through sections 236 and 238 of a coil 231. Emitter 212 is connected to base 214 through section 234 and a resistance 244, and emitter 222 is connected to base 224 through section 240 and a resistance 246. One end of coil 231 from section 232 thereof is connected to the firing electrode 251 of the photo flashtube 250 through a diode 252 poled in reverse direction of current flow, the junction point 253 of electrode 251 and diode 252 connected to the other end of coil 231, i.e., section 242 thereof, through a diode 254 poled in the same direction. One electrode of tube 250 is connected to said junction point 253 the other electrode being connected directly to the positive terminal of battery 230. A capacitance is connected between junction point 253 and the positive terminal of battery 230.

Figure 7:
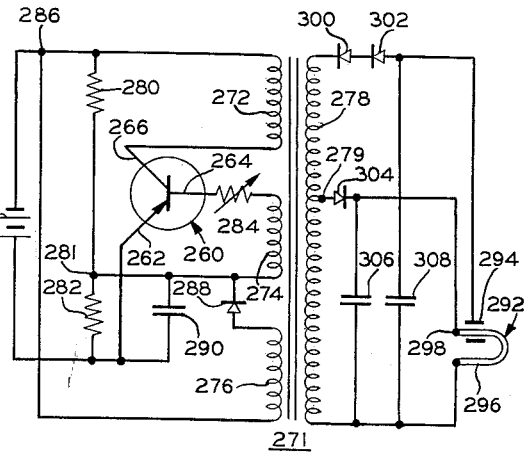

In Fig. 7 there is shown another embodiment of a circuit to be utilized in a miniature portable device for a photo flashtube. In this circuit, the emitter 262 of transistor 260 is connected to the positive terminal of battery 270, collector 266 being connected to the negative terminal of battery 270 through a winding 272 of a transformer 271. Connected across battery 270 is a voltage divider comprising resistances 280 and 282. Base 264 is connected to the junction point 281 of resistances 280 and 282 respectively through a variable resistance 284. The junction point 286 of winding 272 and the negative terminal of battery 270 is connected to variable resistance 284 through a winding 276, a diode 288 poled in the forward direction of current flow and winding 274. A capacitance 290 is connected across resistance 282. It is seen that in this arrangement as in the circuits of the preceding figures, regenerative feedback is provided to produce oscillation. Winding 278 has one end thereof connected to the metal shield firing electrode 294 of flashtube 292 through series-connected diodes 300 and 302, the diodes being poled in the reverse direction of current flow. The other end of winding 278 is connected to the anode 296 of tube 292. An intermediate point 279 on winding 278 is connected to cathode 298 of tube 292 through a diode 304 poled in the forward direction of current flow. A capacitance 306 is connected between the junction point of diode 304 and cathode 298 and the other end of winding 278 and another capacitance 308 is connected between the junction point of firing electrode 294 and diode 312, and said end.

Typical values for the circuit of Fig. 7 are resistance 280, 150 ohms; resistance 282, 2 ohms; resistance 284, 0 to 50 ohms; capacitance 290, 100 to 200 μf.; capacitance 306, 0.1 to 1 μf.; and capacitance 308, 0.01 to 0.1 μf. Diode 288 should be preferably rated at 30 volts and diodes 300 and 302 may preferably be silicon diodes rated at 500 volts each. Winding 272 may suitably have 32 turns; winding 274, 14 turns; winding 276, 18 turns, and winding 278 about 2,000 turns, of which the upper and lower portions as shown in Fig. 7 may comprise 900 and 1100 turns respectively. In this circuit, winding 276 is provided to cut off the load current when capacitances 306 and 308 are charged, thereby providing greater efficiency and is not necessary where great efficiency is not desired. With the values for the circuit components in Fig. 7 as set forth hereinabove, an output frequency of about 3,000 c.p.s. is provided, the wave form being of a needlelike shape, and with battery 270 having a value of 3 volts, 200 to 500 volts is provided for energizing flashtube 292.

The core material used in the transformer depicted in the circuits of Figs. 1 through 7 are preferably of a low-loss magnetic substance such as Permalloy. Such cores are readily utilizable in miniature form. The fluorescent tubes, electronic photo flashtubes, or other electron discharge tubes to be used in this invention can be made in dimensions as small as desired. The power requirement of such tubes is very low, and consequently the current drain from a low voltage battery is correspondingly low. The battery may suitably be of a primary or secondary type. In the event secondary batteries are used, a charging circuit may be provided in the same housing with the battery, suitably connected, and means may be provided on the housing to connect the battery and charging circuit to a line power source, such means being most conveniently in the form of a pair of outlet prongs. The series capacitances, choke coils, etc., required in the operation of fluorescent tubes in the common illuminating circuit are not required because the inductive watt-less power is of no importance. Even high-voltage fluorescent tubes can be utilized as light sources, since any desired voltage can be taken from the secondary winding of the transistor oscillator circuits, there just being required suitable selection of circuit component values.

All the component parts, consisting of dry batteries or miniature storage batteries, together with the circuit elements required for recharging, the transistor or transistors, the transformer, and other necessary circuit components can be housed without difficulty in pocket flashlight models having a size similar to that of known such devices. In the case of hand lamps or other portable light sources with more powerful lamps, there is likewise enough space available for the housing of the component parts. With this arrangement, the entire device can be designed in such a manner that the flashlight, hand-lamp, etc., can be plugged directly into a line outlet for recharging the battery where a storage battery is used.

The load device, such as the electronic flashtube, fluorescent tube lamp, etc. may be included with the other circuit components in a unitary housing or may be contained in a separate load head. In the event that miniature storage batteries are used, it is expedient to construct the batteries with the recharging circuit elements in a first housing having outlet prongs thereon which may be inserted into power outlet for recharging. In the case of larger portable light sources wherein larger storage batteries are required, an appliance plug can also be provided so that the batteries can be connected directly to the power line with an ordinary power cord for the recharging thereof.

In Fig. 8, there is shown schematically an embodiment of a total device in accordance with the invention. A first housing 350 consisting of plastic or other suitable relatively rigid and strong material contains therein a battery 352, a transistor oscillator 354 having its input coupled to the output of battery 352 and a transformer 356 coupled to the output of oscillator 354. In the event that the battery 352 is a storage battery, a charging circuit 358 is provided therefor. Charging circuit 358 is adapted to be connected to battery 352 by the schematically depicted switch means designated by numeral 360. Extending from one end of housing 350 are a pair of outlet prongs 362 for inserting housing 350 into a power line outlet to connect the charging circuit thereto. A switch 364 is shown which when closed completes the circuit between the elements contained within the housing. A second housing 366 contains therein the load device such as a fluorescent tube designated by the numeral 368. Housing 366 preferably consists of the same material as housing 350 and is so configured that when housings 350 and 366 are engaged, the total effect is a device having a unitary esthetic configuration. To engage housings 350 and 360, openings 371 are provided in housing 366 in registration with prongs 362 whereby the latter are received therein. Upon the engaging of housings 350 and 366, leads from load 368 are placed in circuit with transformer 356, such leads being received in openings 370 provided therefor in housing 350 and in registration therewith. It is understood that the elements shown in Fig. 8 are schematic. Their arrangement has been merely depicted in logical form since the physical arrangement and packaging thereof is conventional and well known in the art.

In Fig. 9 there is shown a preferred charging circuit when the battery utilized is a storage battery. The circuit comprises a series arrangement of an impedance 400 which may be a resistor, a thermistor, a capacitance and the like, and a rectifier 402 poled as shown. When the charging circuit is connected to battery 404, the cathodic end of rectifier 402 is connected to the positive terminal of the battery and one end of impedance 400 is connected to one of the outlet prongs as shown in Fig. 8. A capacitance 406 has one end connected to the anodic end of rectifier 402 and the other end of impedance 400. The other end of capacitance 406 is connected to the other outlet prong and the negative terminal of battery 404. Numeral 408 designates the line power voltage source in the circuit when prongs 362 (Fig. 8) are inserted therein.

The function of the depicted arrangement of capacitance 406 and impedance 400 can best be understood by referring to the expression $$Ue = \mu\left(1 - e^{\frac{-t}{RC}}\right)$$

wherein $Ue$ represents the momentary voltage applied to capacitance 406 at time $t$, $U$ is the voltage at the source, $t$ is time, R is the value of impedance 400 in ohms and C is the value of capacitance 406 in farads.

At the instant that the circuit is connected to source 408, full current flows as determined by the voltage of source 408 and impedance 400. Impedance 400 has a value so that each current has the value of that required to charge battery 404. By choosing the values of impedance 400 and capacitance 406 so that the time constant defined by their RC product is greater than the frequency of the alternating current voltage from source 408 (usually 60 cycles per second), the voltage appearing at junction point 409 will always be that required to charge the battery and no more.

While there have been described what are at present considered to be the preferred embodiments of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. A portable electronic flashtube apparatus comprising a first housing containing therein a storage battery, a transistor oscillator circuit coupled to said battery for producing an alternating current voltage, a transformer including input and output windings, said input winding being coupled to the output of said oscillator circuit, rectifying means in circuit with said output winding for producing a substantially direct current voltage, a charging circuit adapted to be connected to said battery for charging said battery, and means associated with said first housing for connecting said charging circuit to a power line voltage source, a second housing containing therein an electronic flashtube, means for engaging said first and second housings, and means for coupling said output winding to said tube when said housings are engaged.

2. A portable light source as defined in claim 1 wherein said rectifying means comprises first and second rectifying means in circuit with said transformer output winding, said first rectifying means providing a substantially direct current operating voltage for said tube, said second rectifying means providing a substantially direct current ignition voltage to said tube.

3. A portable electronic flashtube apparatus comprising a first housing containing therein a storage battery, a transistor oscillator circuit coupled to said battery for producing an alternating current voltage, a transformer including input and output windings, said input winding being coupled to the output of said oscillator circuit, rectifying means in circuit with said output winding for producing a substantially direct current voltage, a charging circuit adapted to be connected to said battery for charging said battery, and a plurality of prongs associated with said first housing for connecting said charging circuit to a power line voltage source, said charging circuit comprising a series arrangement of an impedance and a rectifier, one end of said rectifier being adapted for connection to the positive terminal of said battery, one end of said impedance being connected to one of said prongs, and a capacitance having one end connected to the junction point of the respective other ends of said rectifier and said impedance, the other end of said capacitance being connected to the negative terminal of said battery and a second of said prongs, the respective values of said impedance and capacitance being so chosen that their time constant is greater than a time of a cycle from said power source, a second housing engageable with said first housing, said second housing containing therein an electronic flashtube, means for engaging said first and second housings and means for coupling said output winding to said tube when said housings are engaged.

4. A portable light source as defined in claim 3 wherein said impedance is a resistance.

5. A portable light source as defined in claim 3 wherein said impedance is a capacitance.

6. A portable light source as defined in claim 3 wherein said impedance is the thermistor.

References Cited in the file of this patent

UNITED STATES PATENTS

| 2,319,144 | Lodge | May 11, 1943 |
| 2,642,520 | Coolidge et al. | June 16, 1953 |
| 2,880,302 | Witte | Mar. 31, 1959 |

FOREIGN PATENTS

| 1,123,405 | France | Mar. 16, 1955 |